Aug. 7, 1934.   J. R. PEIRCE   1,969,383
CARD PUNCH
Filed April 18, 1930   10 Sheets-Sheet 1

FIG. 1.

Inventor
J. R. Peirce
By his Attorney
W. M. Wilson

Aug. 7, 1934.     J. R. PEIRCE     1,969,383
CARD PUNCH
Filed April 18, 1930     10 Sheets-Sheet 2

Aug. 7, 1934.　　　　J. R. PEIRCE　　　1,969,383
CARD PUNCH
Filed April 18, 1930　　10 Sheets-Sheet 3

Aug. 7, 1934.  J. R. PEIRCE  1,969,383
CARD PUNCH
Filed April 18, 1930    10 Sheets-Sheet 9

Patented Aug. 7, 1934

1,969,383

UNITED STATES PATENT OFFICE 1,969,383

CARD PUNCH

John Royden Peirce, New York, N. Y., assignor, by mesne assignments, to International Business Machines Corporation, New York, N. Y., a corporation of New York Application April 18, 1930, Serial No. 445,393

18 Claims. (Cl. 164—112)

This invention relates to card perforating machines and more specifically to a machine for applying statistical and other data to record cards, adapted for use in the control of automatic tabulating machines, in the form of perforations.

Statistical cards used in tabulating machines and commonly known as the Hollerith card are provided with a plurality of vertical columns of index point positions in which a hole is perforated in one of the positions in each column to indicate a value. Machines are provided in which a single row of punches is provided and the card is fed step by step or column by column past the punches and one of the punches is actuated between each feeding step to punch a hole in the column. Other machines are provided in which a row of punches is provided for each row of index point positions on the card, means being provided to set up one of the punches in each column and thereafter pressing the card against the punches thus set up or pressing the punches themselves against the card to perforate a hole in each of all the columns simultaneously. In the punching of cards, however, it is often necessary to punch the same data in certain columns of a large number of cards. For instance, if the date is being punched in the cards the same date will often be punched in all of the cards of a particular group. Also certain columns are frequently assigned for the perforation of a group number and large stacks of cards will bear the same group number so that in perforating the cards these numbers are repeated for each card.

One of the objects of the present invention is to provide improved means whereby a number which is to be repeated in a group of cards may be set up but once and automatically repeated in the perforating of each successive card, other variable data being reset for each of the cards.

Another object is to provide means whereby a number of punches may be set for operation and the machine then set to automatically feed a card to the punches, perforate the card and automatically restore the punches to normal position ready for a subsequent setting up operation.

Another object of the invention is to provide in a machine of this character visible means for indicating when a selected punch has been set.

Another object is to provide visible means for determining the set up of gang punching information.

Another object is to provide back stepping mechanism by which the carriage may be stepped back a plurality of steps in one operation, if desired.

Another object is to provide stepping mechanism in which, after a punch in a predetermined column has been set, the punch setting carriage will automatically skip a set column or a plurality of columns to the next predetermined column to be set.

Another object is to provide means whereby the punch setting carriage may be automatically restored to normal position by depression of a key.

Further and other objects and advantages will be hereinafter set forth in the accompanying specification and claims, and shown in the drawings, which by way of illustration show what is now considered to be the preferred embodiment of the invention.

Card feed roller drive

Figure 1:
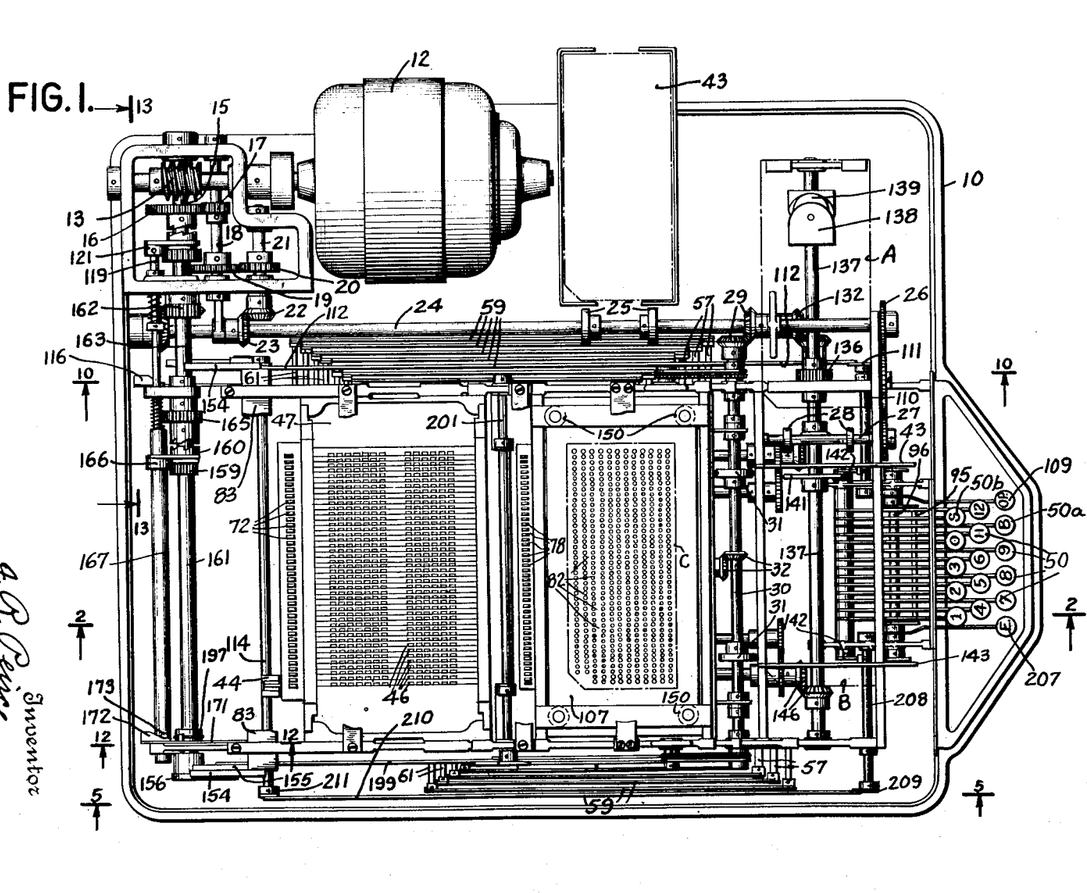
Fig. 1 is a plan view of the machine partly in section.
Figure 7:
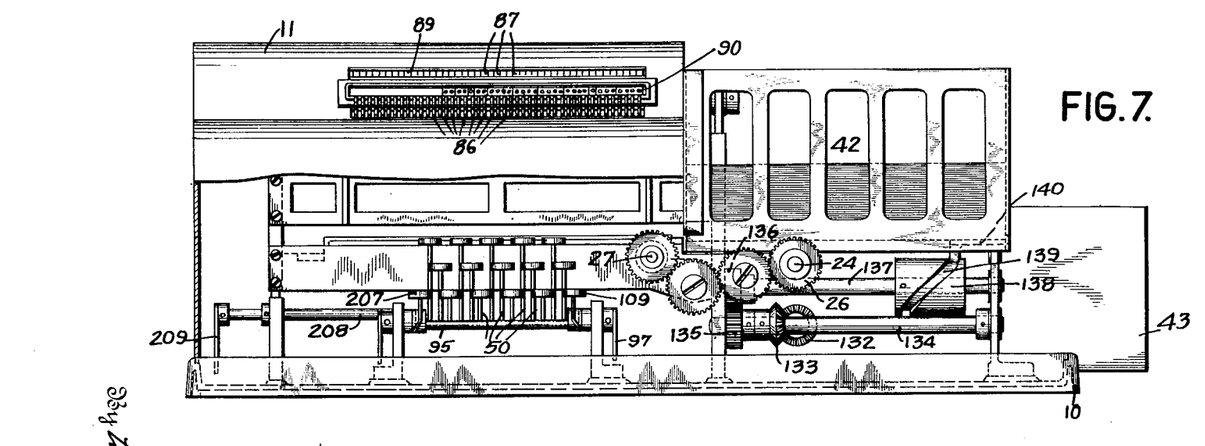
Fig. 7 is a front elevation of the machine.
Figure 10:
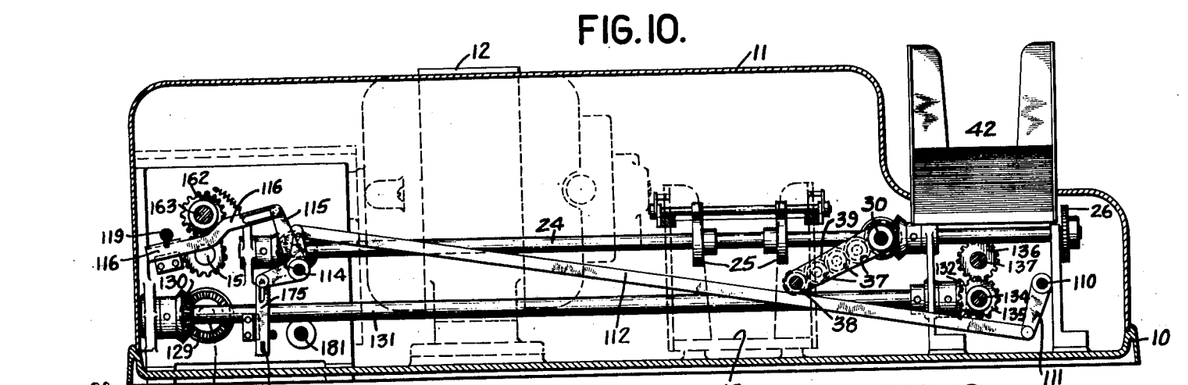
Fig. 10 is a section on line 10—10 of Fig. 1, showing the feed roll drive mechanism.

Referring to the drawings, the machine is shown as mounted upon a base 10 and enclosed with a casing 11. In Figs. 1 and 10 a motor 12 has mounted upon its shaft a worm 13 (see also Fig. 13) which through engagement with a worm gear 14 is adapted to drive a shaft 15 upon which is mounted a gear 16. Meshing with gear 16 (see also Fig. 14) is a pinion 17 mounted on a shaft 18 which also carries a gear 19 having engagement with a pinion 20 on a shaft 21. In Fig. 1 a bevel gear 22 is attached to one end of the shaft 21 and is in mesh with a bevel gear 23 secured on a shaft 24 upon which is also mounted a pair of card feed rollers 25. The forward end of the shaft 24 (see also Fig. 7) carries a gear 26 which through the train of gearing shown actuates a cross shaft 27 upon which a further pair of feed rollers 28 is mounted.

The shaft 24 has further driving connection through a pair of mitre gears 29 (Figs. 1 and 17) with a shaft 30 upon which is mounted a third pair of feed rollers 31 and which has bevel gear connection 32 to a stud 33 (see also Fig. 18) which through train of gearing 34 causes the actuation of shaft 35 and the feed rollers 36 mounted thereon. Shaft 30 through further trains of gearing 37 (as in Figs. 10 and 17) drives a shaft 38 carried by the side arms 39 which are hung upon the shaft 30 (see also Fig. 2). From the shaft 38 gears 40 are adapted to drive a pair of rollers 41 carried upon extensions of the two inner arms 39 (see Fig. 17). These various rollers whose drive has thus been traced from the motor 12 are adapted to rotate constantly with the motor.

The cards to be punched are placed in a magazine 42 (Figs. 7 and 10) and in a manner to be described advanced singly from the bottom of the stack into the bite of the first pair of feed rollers 28 which advance the card from the position A in Fig. 1 to a position B from which the card is moved by a suitable picker mechanism, also to be described, to the left as viewed in Fig. 1. The feed rollers 31 and 41 will then advance the card to the punch position designated C (see also Fig. 17) wherein the data is recorded on the card. After the punching operations have been performed, the card is ejected to the discharge pocket 43 by the rollers 36 which move the card into the bite of the rollers 25 which in turn convey it to the pocket 43.

Punch set up carriage

Figure 16:
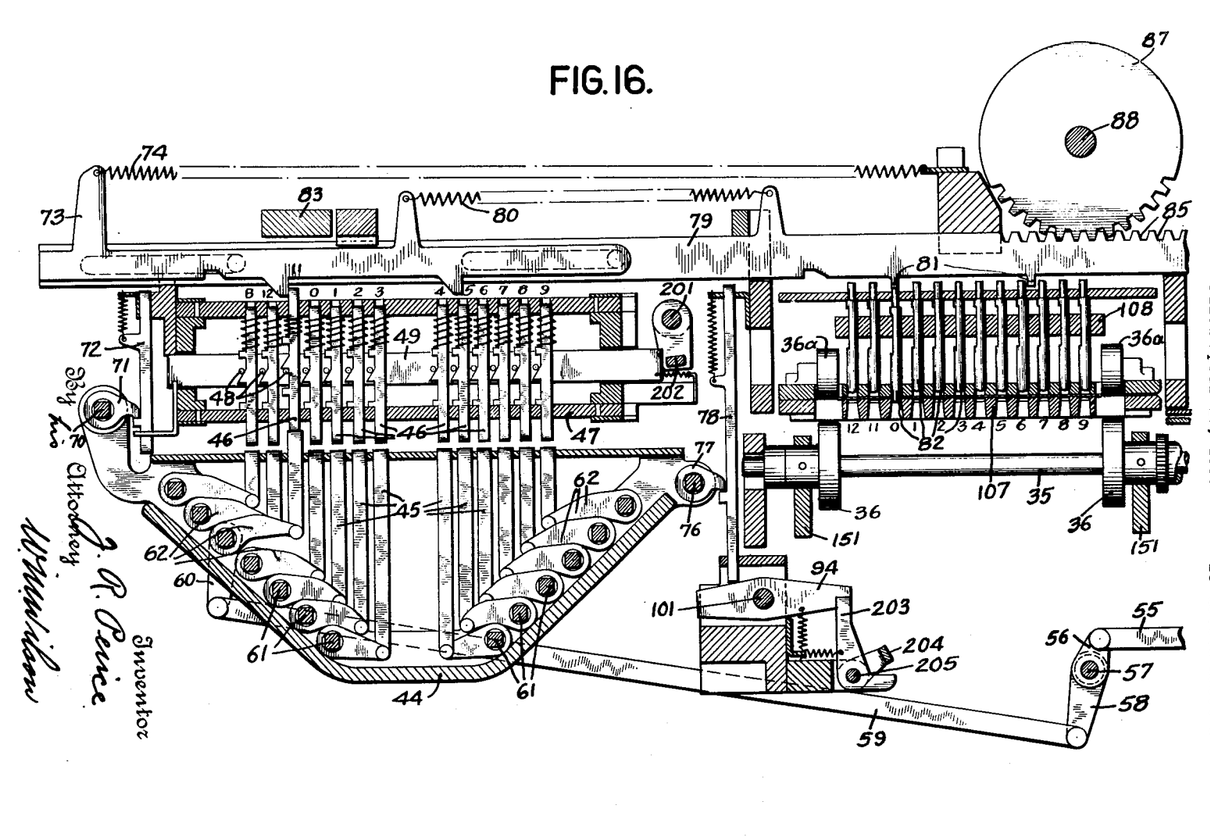
Fig. 16 is an enlarged position view of the punches and the mechanism for selecting them.

The punch set up carriage 44 (Figs. 2, 16 and 19) is provided with thirteen plungers 45, twelve of which correspond to the usual index point positions of the Hollerith card and the thirteenth is used for selecting a blank position. The carriage cooperates with a punch selecting frame 47 wherein are mounted, as in Fig. 1, a plurality of columns of latch members 46, one column for each of the forty-five columns of the card. The carriage 44 is adapted to be advanced step by step below the frame 47 to register successively with the columns of members 46. The upward movement of any plunger 45 will move upwardly its corresponding member 46 to a position as shown in Fig. 16, wherein a pin 48 will move into locking engagement with the member 46 and hold it in elevated position until the plate 49 upon which the pins 48 are mounted, is moved to the left. Carriage 44 carries rollers 44a which are suitably guided in tracks 44b (see Figs. 2 and 19) for lateral movement.

Punch selecting keys

Figure 2:
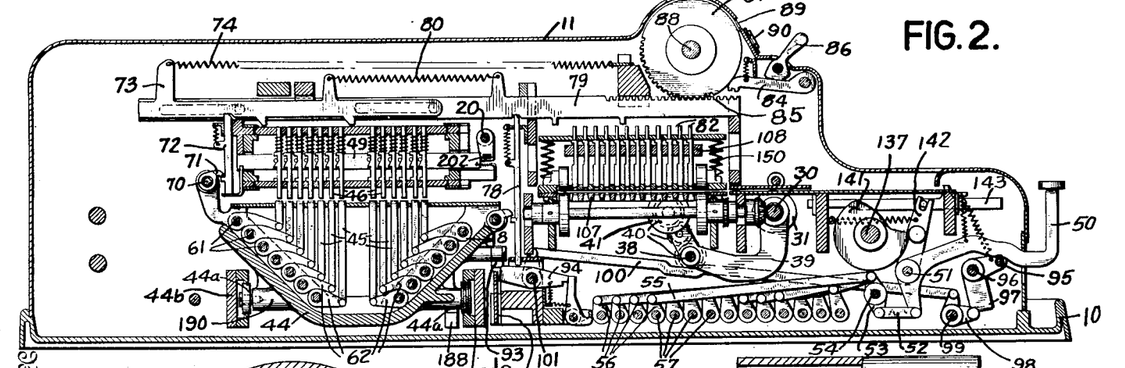
Fig. 2 is a cross section of the machine through the punching mechanism taken on line 2—2 of Fig. 1.

In Figs. 1 and 2 the punch selecting key levers 50 corresponding to the index point position of the card are loosely mounted upon a rod 51 and through links 52 are connected to double armed levers 53 loose on a rod 54. The upwardly extending arms of the levers 53 have link connections 55 to arms 56 secured to cross shafts 57 so that depression of a key lever 50 through the linkage traced will cause clockwise movement of the corresponding cross shaft 57.

Figure 5:
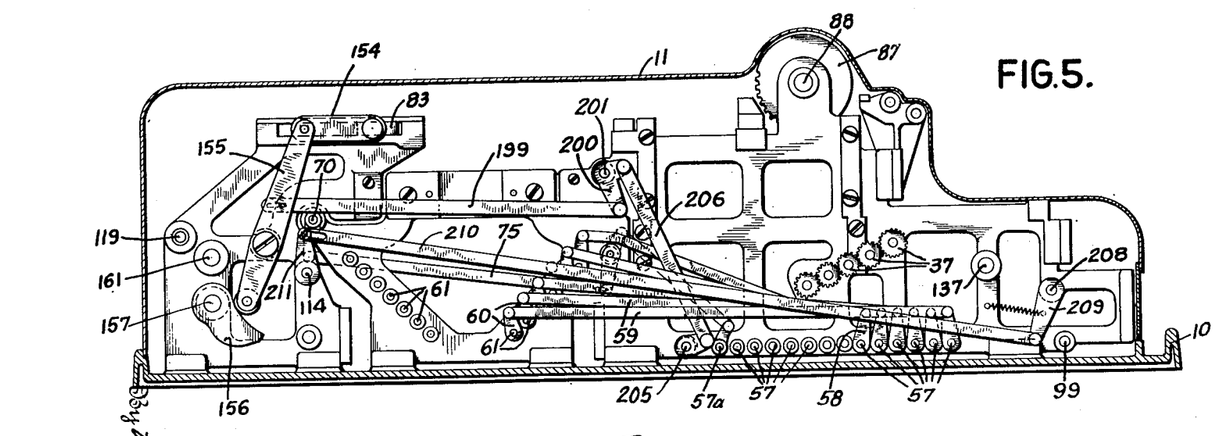
Fig. 5 is a side view of the machine taken on line 5—5 of Fig. 1.

In Figs. 1 and 5 the extremities of several of these cross shafts 57 have arms 58 mounted thereon which through links 59 are connected to arms 60 which in turn are secured to the shafts 61 on the right side of the carriage 44. The remaining shafts 57 have similar arm and link connections at their other ends to the shafts 61 which pass through the left side of the carriage 44. One of such connections is shown in Fig. 16. Thus upon depression of any key lever 50 the linkage thus described will act to rock the corresponding shaft 61. Those on the right side of carriage 44 (as viewed in Fig. 16) will be rocked in a clockwise direction while those to the left will be rocked in a counterclockwise direction.

Figure 19:
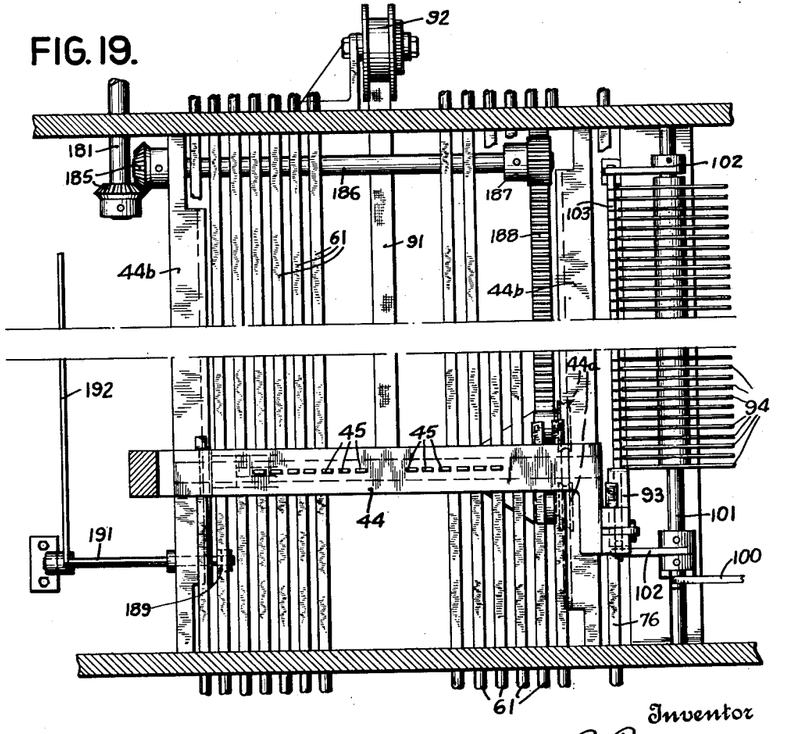
Fig. 19 is a plan detail of the punch setting carriage, showing its relation to the punch columns.

Referring also to Fig. 19, it will be observed that the shafts 61 are rectangular in cross section and pass through similar openings in arms 62 in the carriage 44. It is thus evident that as the carriage 44 is moved laterally with respect to frame 47 the arms 62 are adapted to slide upon the shaft 61 and due to the manner of connection therewith will be actuated by the cross shafts in any position to elevate the connected plunger 45 and thus latch a member 46.

Release of the punch interposers

Figure 6:
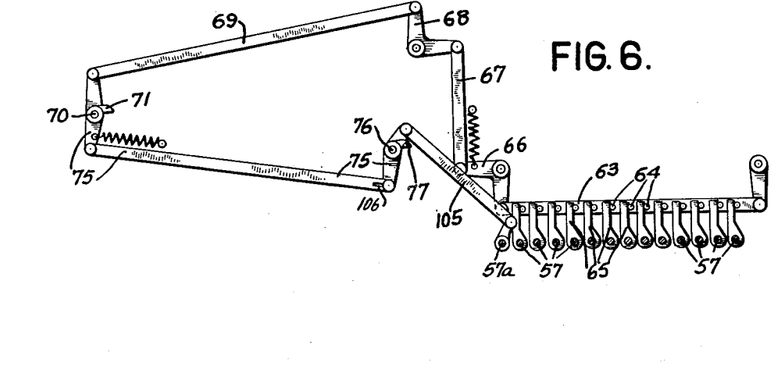
Fig. 6 is a detail of certain escape mechanism controlled by the keys.

In addition to the setting of a latch member 46 through the depression of the corresponding key lever 50, as has been explained, the depression of any of such keys by rocking its corresponding cross shaft 57 is adapted as in Fig. 6 to move a common link 63. Link 63 carries a plurality of pins 64 cooperating with arms 65 secured to the several shafts 57 so that rocking of any shaft due to depression of its key lever will cause movement to the right of the link 63, and through bell crank 66, link 67, bell crank 68, and also link 69. The movement of link 63 is adapted to rock a shaft 70 upon which is slidably mounted a finger 71 (see also Figs. 2 and 16). Finger 71 is contained in the carriage 44 and due to the rectangular structure of the shaft 70 is adapted to slide upon said shaft when the carriage is moved. Thus the depression of any key lever 50 will in addition to rocking its corresponding shaft 61, also rock the shaft 70, and the finger 71 will move a spring pressed plunger 72 from the position of Fig. 2 to that of Fig. 16. The plunger 72 in its upper position is adapted to hold a slide bar 73 against the tension of its spring 74 so that upon release of the bar it may advance into cooperation with the latch member 46 which may be moved upwardly into its path.

In Fig. 6, shaft 70 is shown as having arm and link connection 75 with a similar shaft 76 upon which is also mounted in a similar manner a finger 77 which as shown in Figs. 2 and 16 is adapted to depress a spring pressed latch 78 moving the latch out of engagement with the interposer bar 79. The interposer bar 79 is resiliently connected through a spring 80 with the slide 73, so that, when the slide 73 is released by the plunger 72 for advance, the bar 79 will move therewith.

Depending from the bar 79 are projections 81 which are adapted to cooperate with the punches 82 and the relation between the projections 81 and the punches 82 is such that only one of the projections 81 will cooperate with a punch at one time. Two projections 81 are provided to lessen the distance which the bar 79 would have to travel with but a single projection. For a like reason the slide 73 is provided with two depending projections cooperating with the latch members 46.

Briefly summarizing the setting of an interposer bar, the depression of a key lever 50 will cause the rocking of the corresponding shaft 61 and also shafts 70 and 76, thus moving the selected latch member 46 into the path of the slide 73 and at the same time releasing the slide for actuation by its spring 74 by the withdrawal of the associated plungers 72 and 78. The slide 73 will thus advance a distance permitted by the upwardly extending member 46 to position one of the projections 81 over the corresponding punch 82. Upon completion of the punching operation a restoring bar 83 is moved to the left to restore all of the slides 73 to the left, where their associated plungers 72 will hold them. The resilient connection 80 between the slides 73 and 79 will permit the restoration of slides 73 without affecting the interposer bar 79, if it is desired to maintain the bar in its set position.

Interposer bar position indicator

Figure 3:
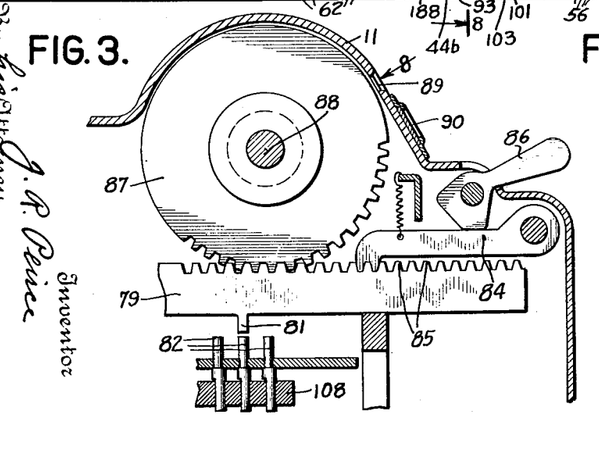
Fig. 3 is an enlarged detail of the punch set up indicating disks.
Figure 4:
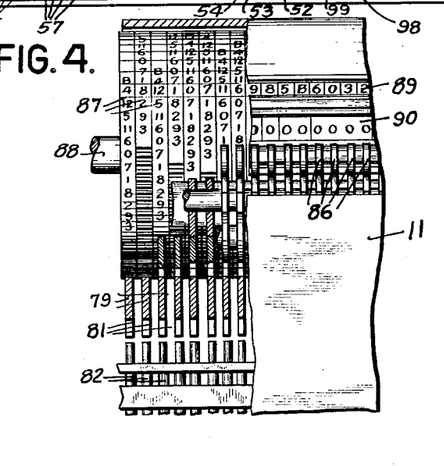
Fig. 4 is an end elevation of parts in Fig. 3.

In Figs. 2 and 3 a pivoted member 84 is provided, one for each column, having its free end adapted to mesh with the teeth 85 in the upper edge of bar 79. After the bar 79 has been advanced to punch selecting position, a cam finger 86 may be rocked from the position of Fig. 2 to that of Fig. 3 where it will cause the engagement of the bar 79 by the member 84 to securely lock the bar 79 in punch selecting position. The teeth 85 are also adapted to mesh with teeth in disks 87 (see also Fig. 4) freely mounted on a shaft 88. The disks 87 may have engraved upon their periphery, numbers which cooperate with an opening 89 in the casing 11 to visibly indicate the position in which the corresponding interposer bar 79 has been set.

A suitable guide 90 may also be provided in which may be inserted the usual column indicating strip so that an operator at a glance may know just what amounts have been set in a particular field of the card and also which columns are locked for gang punching. In addition to the usual index point position keys, there is also provided a key 50a in Fig. 1 which upon depression will in a manner identical with any key 50 permit a slight advance of the bar 79 to indicate that the particular bar is in a blank or non-punching position.

Carriage escape mechanism

Figures 8, 9:
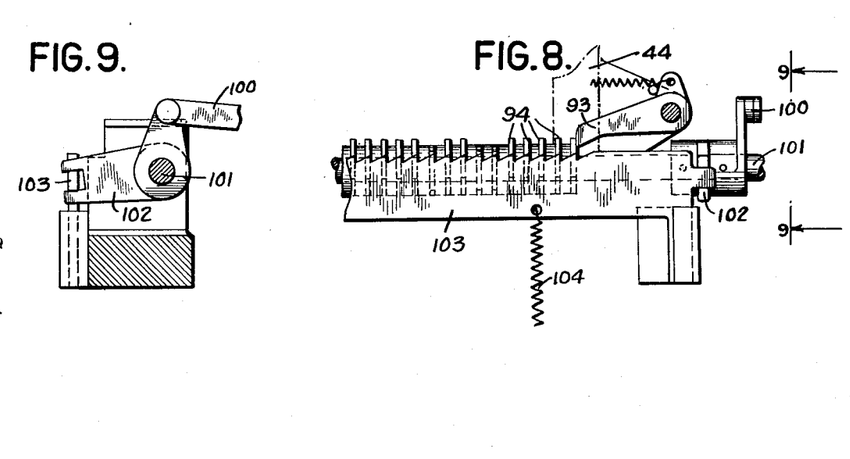
Fig. 8 is a detail of the carriage escapement mechanism taken on line 8—8 of Fig. 2.
Fig. 9 is a further detail of escape mechanism, being a section on line 9—9 of Fig. 8.

In Figs. 2 and 19 the carriage 44 has connected thereto a tape 91, the other end of which is connected to a spring wound drum 92 of the usual type. Mounted upon the carriage is a spring pressed escapement pawl 93 (see also Fig. 8) which cooperates with a series of levers 94, one for each card column.

The engagement of the pawl 93 with the side of a lever 94 holds the carriage in position and the rocking of the lever 94 out of engagement with the pawl 93 will release the carriage for advance under control of the tape 91 and such advance will be interrupted by engagement with the next lever 94 which is positioned in the path of the pawl. Engaging the upper edge of each of the levers 94 is the latch 78 which we have seen is adapted to move downwardly to release the bar 79 so as the bars 79 are successively set up, the latches 78 will be depressed in the same order and will rock the corresponding levers 94 out of cooperation with the escapement pawl 93 thus permitting the carriage to move step by step across the machine to successively cooperate with the columns of the card.

Automatic skipping of columns

Where the bars 79 have been locked by the cooperating levers 84 to preserve the punch set up for repeated punching in successive cards, it may be noted with reference to Fig. 16 that the notch in the lower edge of the bar which cooperates with the latch 78 will be held in a position as shown and upon restoration of the parts the latch 78 will not rise to its initial position and will therefore hold the lever 94 in depressed position so that upon the subsequent setting up of the next card when the escapement pawl 93 approaches the particular column or columns in which the bars 79 have been locked, the levers 94 of these particular columns will be out of cooperating alinement with the pawl 93 and the carriage will therefore not be stopped in these columns but will pass over them to position itself in the first column in which the type bar 79 has been returned to its restored position.

The purpose of the blank key 50a and the reason for permitting an appreciable movement of the bar 79 upon actuation of the blank key is to cause this same depression of the latch 78 in such columns which it is desired to automatically skip and in which no perforations are to appear.

Escapement mechanism

The depression of any of the keys 50 and also the key 50a will, as viewed in Figs. 1 and 2, cause the depression of a bail 95 which is pivoted on a shaft 96 which shaft carries a cam 97 cooperating with a follower arm 98 to rock a shaft 99. The shaft 99 has connection through a link 100 to a shaft 101 (see also Figs. 8 and 9). Depression of any of the aforementioned keys will through the mechanism traced, cause clockwise rotation of the shaft 101, as viewed in the reference figures. The shaft 101 has secured thereto a pair of arms 102 (see also Fig. 19) which have pin and slot connection with a bar 103 mounted for vertical movement in the frame of the machine and normally urged downwardly by a spring 104. The depression of a key therefore will raise the bar 103 so that the ratchet teeth on the upper edge thereof will move up into cooperation with the pawl 93 of the carriage to hold the carriage in position until after a punch selection has been made and until the lever 94 has been rocked out of engagement with the pawl 93. Restoration of the bar 103 will then release the pawl 93 to permit the carriage to move to the left as viewed in Fig. 8, until it cooperates with the next lever 94 positioned in its path.

Space key operation

The space key 50b of Fig. 1 is connected in a manner similar to the keys 50 to a cross shaft 57a (see Fig. 6). This shaft has link connection 105 to the shaft 76 so that clockwise rotation of the shaft 57a will cause similar rotation of the shaft 76. The pin and slot connection 106 permits such movement of the shaft without affecting the movement of the shaft 70 and such rotation of the shaft will as we have already seen depress the latch 78 in the particular column in which the carriage happens to be located, thus dropping the lever 94 to permit the carriage to escape to the next position. The key 50b is connected to the slide 103 in a manner similar to the other keys. Thus depression of the space key 50b will cause an escapement operation of the carriage 44 without setting a punch.

We have seen thus far how the interposer bar 79 under control of the keys 50 and 50a may be positioned over the punches 82 preparatory to effecting a punching operation. After all the desired interposers have been set above the selected punches the die plates 107 (Figs. 1, 2, 15, 16 and 18) are moved vertically upward against the punches. The card being between the die plates will engage the lower ends of the punches and move such of them upwardly as are not in cooperation with a projection 81. In the positions in which such projections are positioned directly above a punch the punch will remain relatively stationary and the card will be perforated thereby in a manner as illustrated in Fig. 16. Upon the restoration of the die plates, the stripper plate 108 fixedly secured to the frame of the machine is adapted to cause withdrawal of the punches from the card in an obvious manner.

Card feeding

It remains now to explain how cards are introduced into punching position, punched and removed from punching position to the magazine 43. These operations are initiated by an operating key 109 (Fig. 1) which is loosely mounted upon the shaft 96 (see Fig. 15a). The inner end of this key has gear teeth meshing with a sector 109a mounted upon a shaft 110 which in Figs. 1 and 10 extends away from the key and carries at its other end a depending arm 111. This arm has link connection 112 to an arm 113 loose upon a shaft 114 (see also Fig. 11). Integral with arm 113 is an arm 115 connected at its upper end to a slide 116 upon which is a camming surface 117 adapted to cooperate with a pin 118 secured in rod 119. The rod 119 is normally adapted to be held to the right in Fig. 13 by a spring 120 bearing against a collar secured to the rod. Thus depression of the operating key 109 through the linkage just traced will draw the slide 116 to the right as viewed in Fig. 11, camming the pin 118 and the rod 119 to the left in Fig. 13.

A bifurcated arm 121 mounted upon the left end of the rod 119 has operating engagement with a clutch element 122 slidable upon the continually running shaft 15 and free to rotate thereon. Integral with the clutch element 122 is a gear 123 meshing with a gear 124 and of sufficient width to remain in engagement with gear 124 when the clutch element 122 is moved to the left into engagement with a clutch driving element 125 integral with continually running gear 16.

Upon movement of the rod 119 to operative position a spring pressed latching arm 126 is adapted to drop behind a collar 127 secured to the shaft to hold it in its operative position until some time later in the cycle. The gear 124 is thus caused to rotate and through its shaft 128 which also carries a bevel gear 129 which in turn meshes with a bevel gear 130 upon a shaft 131 (see Figs. 10 and 13) causes said shaft to turn. The forward end of the shaft 131 carries a bevel gear 132 meshing with a bevel gear 133 (see Figs. 7 and 17) mounted upon a shaft 134 which also has secured thereon a spur gear 135 meshing with a spur gear 136 which in turn is secured upon a shaft 137. The shaft 137 (see also Fig. 1) carries a cylindrical cam 138 upon whose surface is cut a groove 139 cooperating with a picker knife 140 and is adapted upon rotation to advance a card from the bottom of the stack 42 to the constantly running feed rollers 28 which engage the card and advance it to the position B as heretofore explained.

The leading edge of the card abuts a fixed member (not shown) to limit the movement of the card in this forward direction. The shaft 137 carries a cam 141 cooperating with the roller of a follower arm 142 secured to the shaft 51. A second arm 142 is also carried by this shaft and the upper ends of both arms 142 have pin and slot connection with slidable pickers 143 which when released by the cam 141 are adapted to move to the left as viewed in Fig. 2 under the influence of their springs so that the slides 143 may engage the edge of the card and advance it into the bite of the constantly running rollers 31 which move it forwardly to the rollers 41 which in turn advance it to punching position C where it abuts the bottom of the opening between the die plates 107. In this position the rollers 41 rub against the bottom of the card and serve to retain it in place. The card is now in position to be perforated in accordance with the previous setting.

Punching operation

Figure 15:
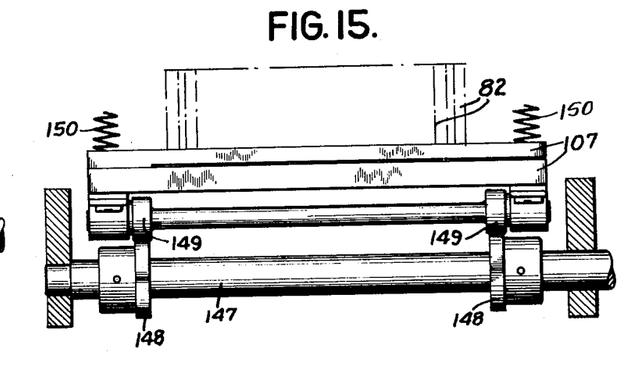
Fig. 15 is a section taken on line 15—15 of Fig. 17, showing the manner of actuating the punch dies.
Figure 15A:
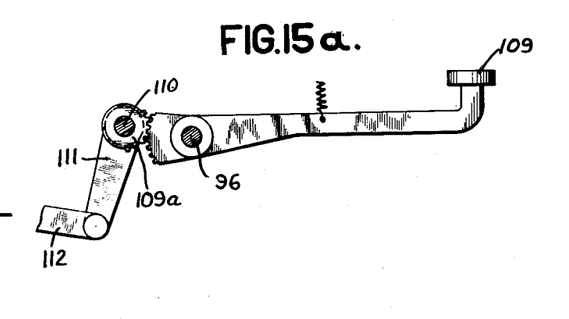
Fig. 15a is a detail of the operating key.
Figure 17:
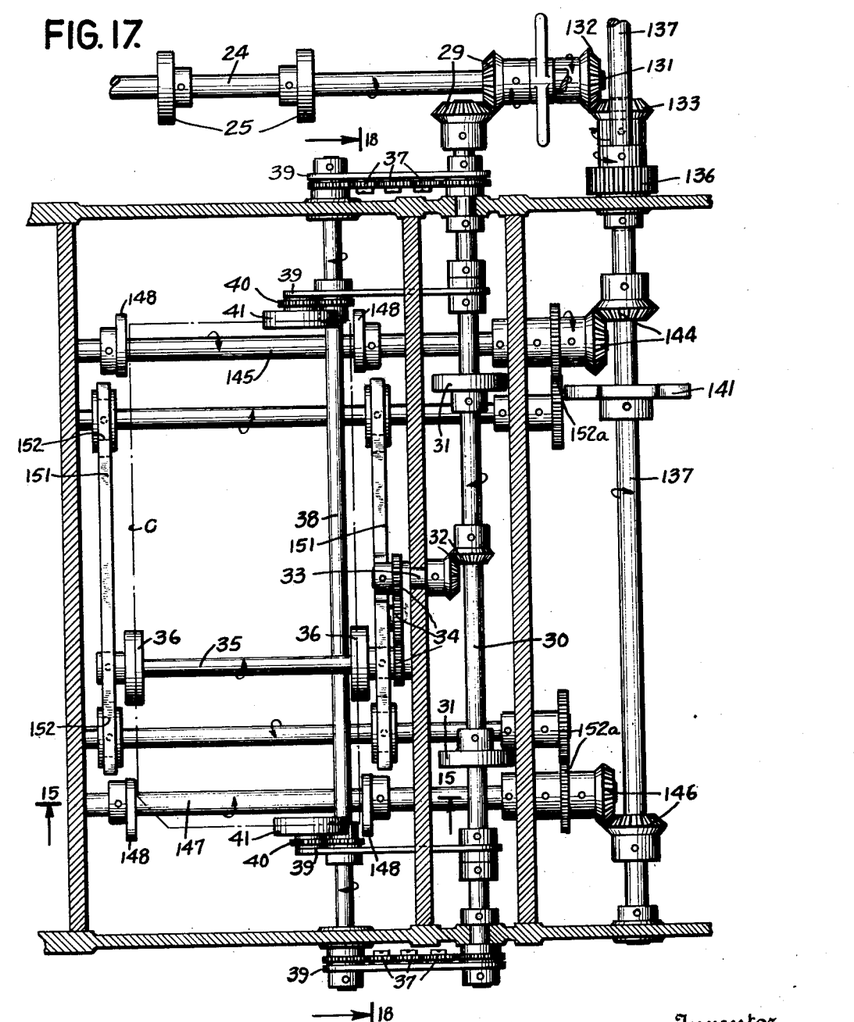
Fig. 17 is a plan detail of driving mechanism, parts of which are shown in Fig. 1.
Figure 18:
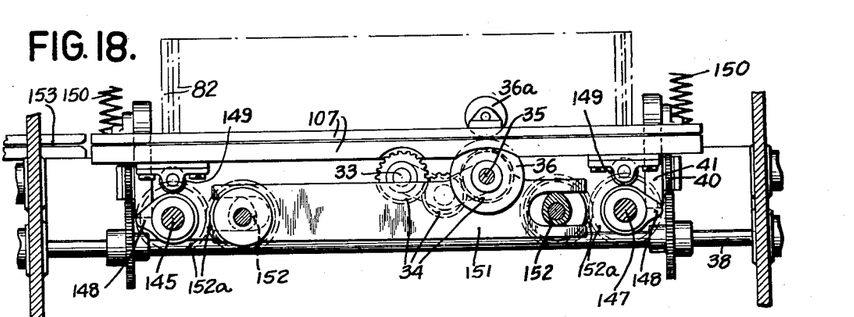
Fig. 18 is a section of further drive mechanism, the section being taken on line 18—18 of Fig. 17.

The punching operation will now be described. In Fig. 17 the shaft 137 has bevel gear connection 144 with a shaft 145 and has also similar bevel gear connection 146 with a shaft 147. On both of these shafts are pairs of cams 148 which as shown in Fig. 18, are adapted upon rotation to cooperate with rollers 149 pivotally mounted upon the underside of the lower die plate 107 so that upon rotation of the cams 148 the die plates 107 will be moved upwardly against the punches 82 to effect punching of the card. The dies 107 are suitably guided for vertical movement and are kept in cooperation with the cams 148 through suitable springs 150 which serve to restore the dies to their normal or lower position after punching has been effected. In Fig. 15 is shown a further view disclosing the structure just described. The rollers 36 have their shaft 35 journalled in side plates 151 mounted for vertical movement and adapted to be actuated by cams 152 cooperating with their bifurcated ends which cams are driven from shafts 145 and 147 by gearing 152a.

Normally the rollers 36 are down out of engagement with their cooperating rollers 36a which are mounted upon the upper die plate 107 so that as the card is advanced to the punching position C the rollers 36 offer no interference to the introduction of the card. As the die plates 107 move upwardly to effect punching they move away from the rollers 41 and the timing of the machine is such that as the die plates 107 are returned to their lower position, just before the rollers 41 again contact with the card in punching position the rollers 36 are moved up by their cams 152 into engagement with the card.

As we have seen, these rollers are constantly rotating and they will engage the card and advance it through the guides 153 to the constantly running rollers 25 which will carry it to the pocket 43. The rapidity of the movement of the card is such that the card is removed from between the die plates 107 before the plates have returned to their lowermost position wherein the rollers 41 are again in their normal effective position. Thus far we have seen that after the punch interposers have been set in accordance with successive depressions of the keys, the card may be fed into punching position, punching effected thereon, and the card removed into a suitable pocket.

The restoration of the punch interposers and the return of the carriage 44 will now be described. The restoring bar 83 (Figs. 1 and 5) has link connections 154 to pivoted levers 155 which carry follower rollers cooperating with cams 156 (see also Fig. 13) secured upon a shaft 157 which shaft has mounted thereon a gear 158 meshing with a gear 159 integral with a clutch element 160 which is loose on shaft 161.

Figure 13:
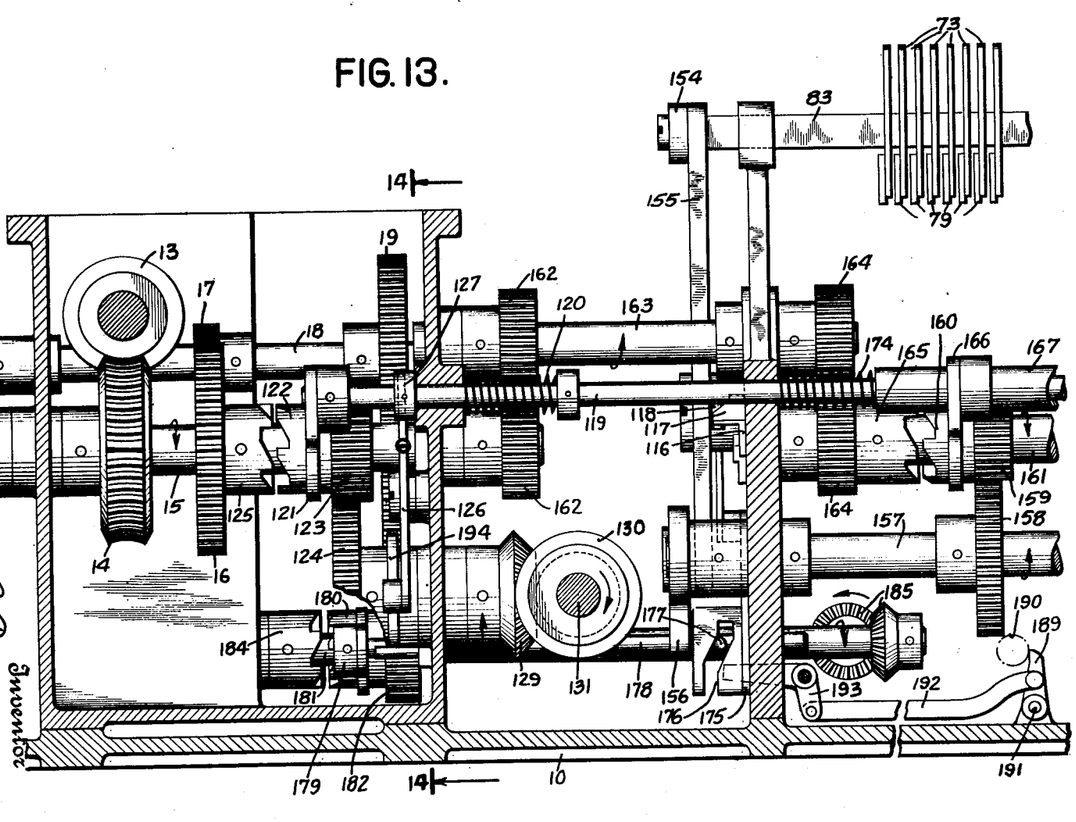
Fig. 13 is a section taken on line 13—13 of Fig. 1, showing the various clutching devices for operating the machine.

Referring to Fig. 13, the constantly running shaft 15 through gearing 162 drives a jack shaft 163 having gearing 164 adapted to drive a clutch element 165 which cooperates with the clutch element 160 (see also Fig. 1). The clutch operating fork 166 associated with the element 160 is secured to a sleeve 167 slidable on the rod 119.

Figure 11:
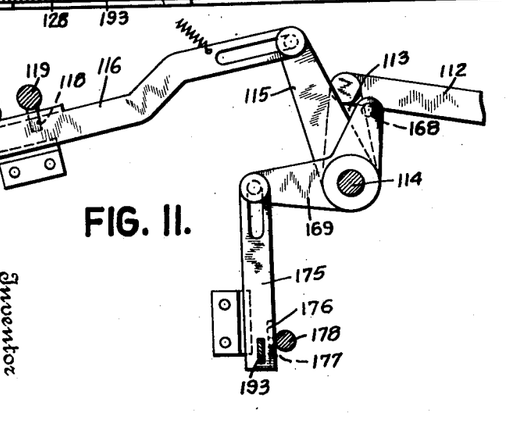
Fig. 11 is an enlarged detail of parts in Fig. 10.
Figure 12:
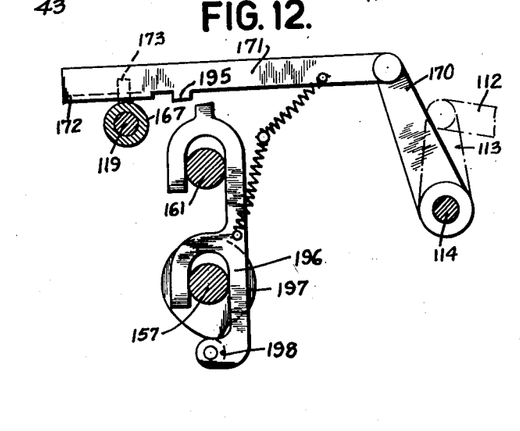
Fig. 12 is a detail of parts taken on line 12—12 of Fig. 1.

Referring to Figs. 10, 11 and 12, it will be recalled that the actuation of link 112 rocks an arm 113 integral with arm 115 to effect the card feeding and clutching operations just described. The arm 115 is adapted to engage a pin 168 secured in a bell crank 169 secured to the shaft 114 to rock said shaft upon actuation of the link 112. At the other end of the shaft 114 is secured an arm 170 the upper end of which has pivoted thereto a slider 171 (see also Fig. 1) which through a cam surface 172 on its free end is adapted to cooperate with the pin 173 extending from the sleeve 167. On rocking of the shaft 114, pin 173 and sleeve 167 will be moved away from the slider 171. This, as may be seen, will cause the engagement between the clutch elements 160 and 165 to cause the rotation of the shaft 157 and the subsequent operation of the interposer restoring bar 83. A spring 174 (Fig. 13) is adapted to disengage the clutch and restore the parts when released at the proper time.

The operation of the restoring bar 83 is such that it moves all the sliders 73 (Fig. 16) to the left where they are latched by the plungers 72 and the associated interposer bars 79 which have not been locked in their set position as heretofore explained, will return with their corresponding sliders 73 to a position where they in turn will be locked by the latches 78. The bar 83 then rides to the position of Fig. 16 where it remains, preparatory to a subsequent setting up operation of the punches.

In Figs. 11 and 13, the bell crank 169 has pin and slot connection with a slide 175 and is adapted upon rocking of the shaft 114 to elevate the slide 175 so that a cam slot 176 therein will cooperate with a pin 177 secured in a rod 178 to move the rod to the left as viewed in Fig. 13. The opposite end of the rod 178 carries a clutch fork 179 cooperating with a clutch element 180 loose upon a shaft 181 (see Fig. 14). Integral with the element 180 is a gear 182 which through an idler 183 has driving connection to the aforedescribed constantly running gear 20 so that upon movement of clutch element 180 in Fig. 13, to the left, it will engage a companion element 184 secured to the shaft 181 to cause operation of the shaft.

*Carriage return*

The other extremity of the shaft has bevel gear connection 185 to a shaft 186 (see also Fig. 19) to which is further secured a pinion 187. This pinion meshes with a rack 188 which in turn is secured to the punch setting carriage 44 so that as the pinion 187 is rotated, it will move the rack 188 which is suitably guided to restore the punch setting carriage 44 to its normal position in preparation for setting up the first column of the card.

Provision is made for disengaging the clutch elements 180 and 184 when the carriage has reached its home position. This mechanism comprises an arm 189 disposed in the path of travel of a lug 190 integral with the carriage 44 so that as the carriage reaches its home position the lug 190 striking the arm 189 will rock a shaft 191 and through link connection 192 to a bell crank 193, one arm of which is disposed in a suitable slot in the slide 175, will draw downwardly upon the slide and positively move the clutch controlling rod 178, in Fig. 13, to the right disengaging the clutch elements and interrupting the restoring action of the parts.

The carriage when thus released will be held in restored position by engagement with the first escapement lever 94 which is engaged in operative position.

Figure 14:
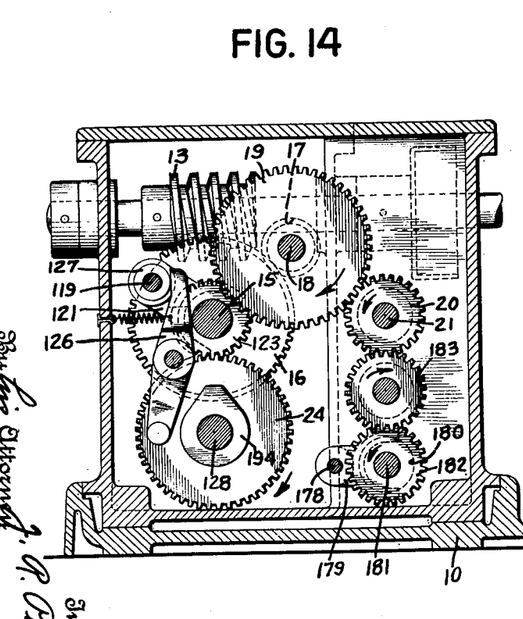
Fig. 14 is a section on line 14—14 of Fig. 13, showing certain of the clutch gearing.

Toward the end of the restoring cycle of operations a cam 194 mounted upon the shaft 128 in Fig. 14, is adapted to cooperate with a roller upon one arm of a spring pressed latch 126 to release the clutch elements 122, 125 so that the spring 120 (Fig. 13) may restore the parts to normal position.

In Fig. 12 it may also be noted that the slide 171 is provided with an extension 195 which when the slide is drawn to the right as viewed in this figure, will be latched by a member 196, spring pressed upwardly to hold the slide in its moved position until toward the completion of the cycle of operations a cam 197 mounted upon the shaft 157 cooperates with the roller 198 of the latch 196 to depress the latch and release the slide 171 so that the spring 174 in Fig. 13 may disengage the clutch elements 160, 165.

In this cycle of operations it is also a function of the machine to restore all the slides 49 (see Fig. 16) to release such latches 46 as may be held in their upper position. To this end, one of the arms 155 (Fig. 5) has pin and slot connection with a link 199 whose other end is connected to a bell crank 200 mounted upon a shaft 201 which shaft in Fig. 16, carries a bail 202 which after the lever 155 has commenced to restore the sliders 73 will cause rocking of the shaft 201 and restoration of the slides 49 to the left, moving the pins 48 out of cooperation with the latches 46 so they may drop under the influence of their springs.

The escapement stop members 94 when depressed by their corresponding plungers 78 are adapted to be latched in their moved position by bell crank latches 203 (as shown in Fig. 16). A bail 204 is adapted during the punching cycle under consideration to rock all the bell crank latches 203 to release the members 94 so they may be turned to normal position, if not prevented from doing so in a manner already explained. The bail 204 is secured to a shaft 205 which in Fig. 5 has arm and link connection 206 to the bell crank 200 so that the restoration of the members 94 occurs simultaneously with the restoration of the slides 49.

*Operation of the error key*

An error key 207 is provided (see Fig. 1) which when depressed is adapted to restore all the punch setting devices which are not locked for gang punching and return the punch setting carriage 44 to its starting position. Error key 207 is loosely pivoted upon the shaft 96 and has its inner end formed with gear teeth in a manner identical with the operating key 109 (see Fig. 15a), these teeth cooperating with a sector in the manner similar to the key 109 to rock a shaft 208 (see also Fig. 5). Shaft 208 at its outer end carries an arm 209 connected by a link 210 through a pin and slot connection to an arm 211 which is secured to the shaft 114 so that depression of the error key 207 will through the instrumentalities just traced cause the clockwise rotation of the shaft 114 (as viewed in Fig. 5). Rocking of shaft 114, as we have already seen in connection with Fig. 12, will rock the arm 170, slide 171 and pin 173, to move the sleeve 167 to the left as viewed in Fig. 13 to cause engagement of the clutch elements 160, 165 which as has already been pointed out, effects the restoration of the slide bars 73 under the influence of the restoring bar 83.

The shaft 114, as we have also seen, through the bell crank 169 (Fig. 11) secured thereto, is adapted through the slide 175, pin 177 and rod 178 to cause engagement of the clutch elements 180, 184 which in a familiar manner through the gears 185, 187 in Fig. 19, cause the restoration of the punch setting carriage 44. In Fig. 11 it will be recalled that the arms 113, 115 are loosely mounted upon the shaft 114 and actuation of this shaft through the depression of the error key will have no effect upon these arms, the pin 168 and bell crank 169 moving away from the arm 115.

*Summary of the operation of the machine*

Briefly reviewing the operation of the machine, cards to be punched are placed in the feed magazine 42 and with the carriage in its initial position in line with the first column of the card the operator may repress the various keys 50 and 50a in succession to effect a punch set up in the proper columns. As these successive columns of punches are set, the corresponding indicating disks 87 are positioned so that the operator has a visual indication through the opening 89 to tell which columns have been set up and to what value.

If during the setting up of the punches an error has been made, or if for any other reason the operator desires to clear the machine of the setting thus far prepared, the error key may be depressed. This will restore the parts of the machine to their original relationship with the disks 87 all restored to non-reading position. Having effected a set up of the various punches, if part or all of the information thus set up is desired to be duplicated on succeeding cards, the various fingers 86 associated with the columns in which the information is to be repeated on successive cards are moved to locking position to maintain the setting indefinitely.

After a complete setting of the card has been accomplished or if the card is only to be partly punched so that the carriage 44 occupies some intermediate position, the depression of the operating key will cause the introduction into punching position of a card which is fed from the feed magazine 42 to the punching position C where it will be raised by the die plates 107 against the punches and such punches as have been previously selected will be forced through the card. The die plates are then brought down out of cooperation with the punches and the prepared card is ejected to the pocket 43. The parts are then automatically restored to their original positions with the exception of such set up bars 79 as have been locked.

Where it is desired to punch a number of cards with the identical information, such information is locked in the machine, and successive operations of the key 109 will feed cards into the machine, to receive such common information, one after another.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims:

1. A punching machine comprising a plurality of columns of punches, an actuating selector for each column, key controlled means adapted to cause differential positioning of each of said actuating selectors and manually controlled means for permanently locking said actuating selector in differentially adjusted position to permit a plurality of recording operations for each setting of the selector.

2. In a punching machine, a punch selector, separate means positively controlled in all directions by the selector and adapted to visibly indicate the position of said selector and means to permanently lock said selector and said indicating means in position to permit a plurality of recording operations for each setting of the selector.

3. In a punching machine, a punch selector adapted to be moved to operative or inoperative position, a separate indicator positively controlled in all directions by said selector, means for permanently locking said selector in operative or inoperative position for a plurality of recording operations, said indicator being adapted to register in what position the selector is locked.

4. In a machine of the class described, a selector differentially positionable, a separate indicator positively connected thereto and manual means operable at will for permanently locking said selector in any position to permit a plurality of recording operations for each setting of the selector and whereby said indicator will register in which position the selector has been locked.

5. In a punching machine, a punch selector, resilient means for moving said selector in one direction and further resilient means for moving said selector in reverse direction.

6. In a punching machine, a punch selecting device comprising a selector, a differentially movable member carried thereby, said selector being adapted to be positioned by said member, means for locking said selector in position and means for moving said member to restored position independently of said selector.

7. In a punching machine, a plurality of columns of pins, a setting carriage therefor adapted to move step by step or column by column in a direction transverse to said columns of pins, a column of plungers carried by said carriage, keys adapted to effect operation of said plungers to move said pins to operative position, and punch selectors one for each column of pins adapted to be released singly by said keys in accompaniment to the actuation of a pin in a corresponding column and means for moving said selector to position.

8. In a punching machine, a plurality of punch selectors, a movable carriage adapted to successively register with said selectors, means incorporated in said carriage to effect positioning of said selectors, and means controlled by said selectors for controlling the movement of said carriage.

9. In a machine of the class described, a plurality of parallel rods, means for rocking said rods about their longitudinal axes, keys adapted to actuate said rods, a carriage movable axially along said rods and means slidable on said rods and contained in said carriage and supported on said rods adapted to be controlled by rocking of said rods to effect punch selection.

10. In a punching machine, a column of punches, a selector cooperating with all of said punches, means for selectively moving said selector to differential positions relative to said punches, the extent of travel of said selector being less than the distance between the end punches of the said column.

11. In a card punching machine, in combination, a card punch structure; operating means therefor, card removing means, including continually running rollers, means controlled by said operating means for moving said rollers into engagement with the card and means controlled by said operating means for retracting said rollers whereby the card is removed after an operation of said punch structure.

12. In a punching machine, a continually running actuator, a plurality of differentially positionable punch selectors, a punch selector setting carriage movable step by step into operative relationship with said selectors, and key controlled means including clutch devices for concurrently and independently restoring said selectors and carriage to normal position by engagement with said continually running actuator.

13. In a punching machine, a continually running actuator, a punch selector, a movable carriage including means for differentially positioning said selector, and means including clutch devices for effecting concurrent operative connection between said actuator and said selector and carriage; said carriage being adapted to cause disengagement of said clutch devices therewith independent of said selectors.

14. In a punching machine, a punch selector, a spring for moving said selector in one direction, means for stopping said selector in differential position and resilient means for moving said selector in reverse direction from its differential position.

15. In a punching machine, the combination with a plurality of punch selectors, individual key controlled mechanism for determining the movement of each punch selector, means responsive to said keys for releasing the punch selectors for setting thereof in succession, and means independently controlled for locking said selectors.

16. In a punching machine, a plurality of columns of punches, a punch selector for each column, a rotatable indicator cooperating therewith to indicate the punch selected, a column indicator associated with said first named indicator to indicate the column of punches selected, locking means for permanently locking said selectors to permit a plurality of recording operations for each setting of the selectors and a column indicator to indicate the selector which is locked.

17. In a punching machine, a plurality of columns of punches, a punch selector for each column, means operated by said selectors for indicating the punches selected thereby, permanent locking means for said selector to permit a plurality of recording operations for each setting of the selector, a column indicator cooperating with said first named indicator and said locking means to indicate the columns of punches to indicate whether a column is locked and the setting therein.

18. In a punching machine, a differentially positionable punch selector, an indicator having driving connection with said selector comprising rack teeth and locking means cooperating with said teeth to permanently hold said selector and indicator in moved position to permit a plurality of recording operations for each setting of the selector.

JOHN ROYDEN PEIRCE.